United States Patent
Yokomizo

(10) Patent No.: US 9,277,074 B2
(45) Date of Patent: Mar. 1, 2016

(54) IMAGE PROCESSING APPARATUS, METHOD, AND MEDIUM DETERMINING WHETHER IMAGE DATA OF A PAGE TO BE PROCESSED IS BLANK AND CONTAINS A FOREGROUND OBJECT AND TRANSMITTING THE FOREGROUND OBJECT OBTAINED BY REMOVING A BACKGROUND OBJECT

(71) Applicant: CANON KABUSHIKI KAISHA, Tokyo (JP)

(72) Inventor: Tsuyoshi Yokomizo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/531,070

(22) Filed: Nov. 3, 2014

(65) Prior Publication Data
US 2015/0156371 A1    Jun. 4, 2015

(30) Foreign Application Priority Data
Dec. 4, 2013   (JP) ................................. 2013-251416

(51) Int. Cl.
*H04N 1/40* (2006.01)
*H04N 1/00* (2006.01)
*H04N 1/407* (2006.01)

(52) U.S. Cl.
CPC ............ *H04N 1/00766* (2013.01); *H04N 1/40* (2013.01); *H04N 1/40062* (2013.01); *H04N 1/4074* (2013.01)

(58) Field of Classification Search
None
See application file for complete search history.

(56) References Cited

U.S. PATENT DOCUMENTS

| | | | | |
|---|---|---|---|---|
| 5,748,780 | A * | 5/1998 | Stolfo | 382/232 |
| 7,813,546 | B2 * | 10/2010 | Yamazaki | 382/167 |
| 8,049,917 | B2 * | 11/2011 | Noguchi et al. | 358/1.15 |
| 2006/0045386 | A1 | 3/2006 | Fukuoka et al. | |
| 2009/0284794 | A1 * | 11/2009 | Ichihashi | 358/1.16 |
| 2010/0064000 | A1 * | 3/2010 | Stroffolino | 709/203 |
| 2013/0235409 | A1 * | 9/2013 | Miyata | 358/1.13 |

FOREIGN PATENT DOCUMENTS

| | | |
|---|---|---|
| JP | 01-129358 A | 5/1989 |
| JP | 4251629 B2 | 1/2009 |

* cited by examiner

*Primary Examiner* — Steven Kau
(74) *Attorney, Agent, or Firm* — Fitzpatrick, Cella, Harper & Scinto

(57) ABSTRACT

The apparatus scans an original, converts the resultant data into image data, deletes the image data of a detected blank page from converted image data, out of the converted image data, in which a blank page is detected, extracts a foreground object from a page which is not a blank page, and separates the foreground image from a background object. If a setting has been made not to output any background object, a page having no foreground object is handled as a blank page, thereby suppressing transmission.

12 Claims, 8 Drawing Sheets

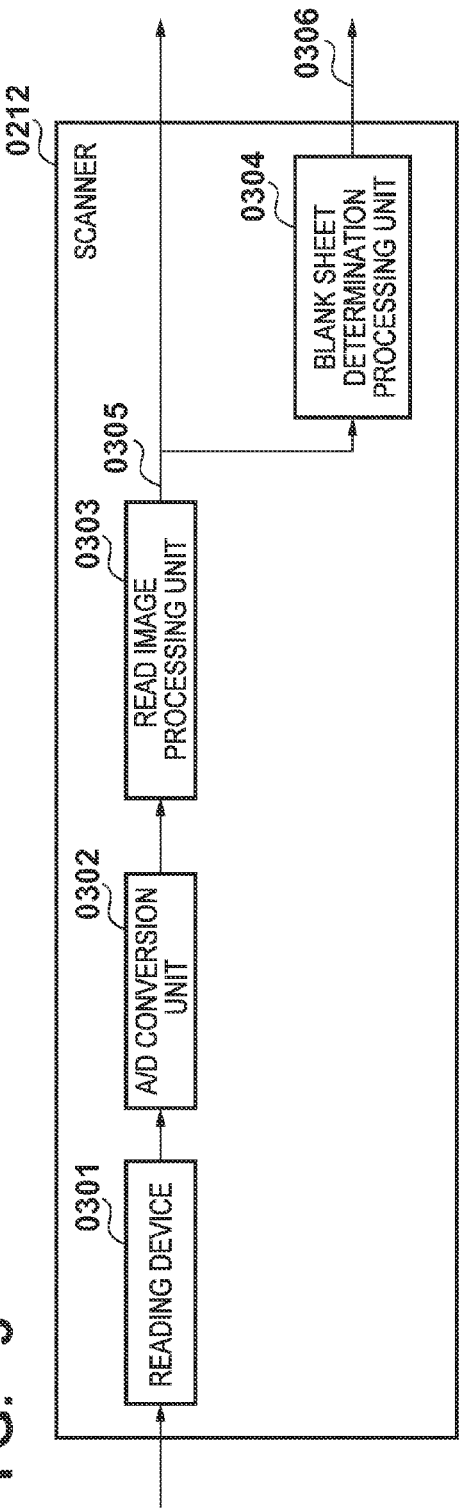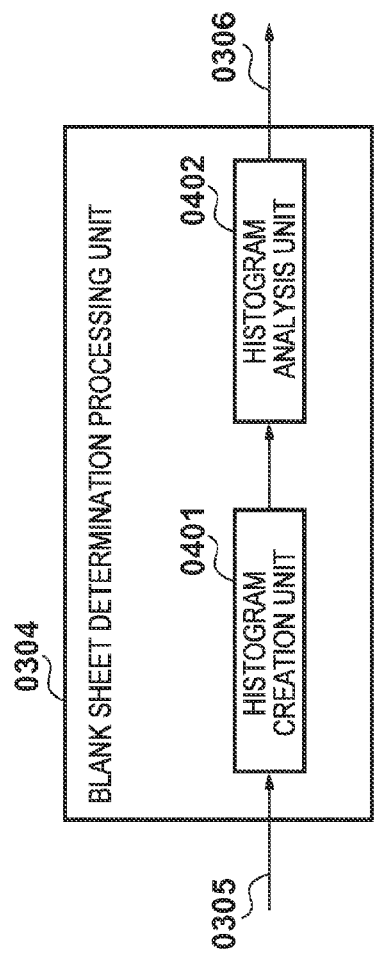

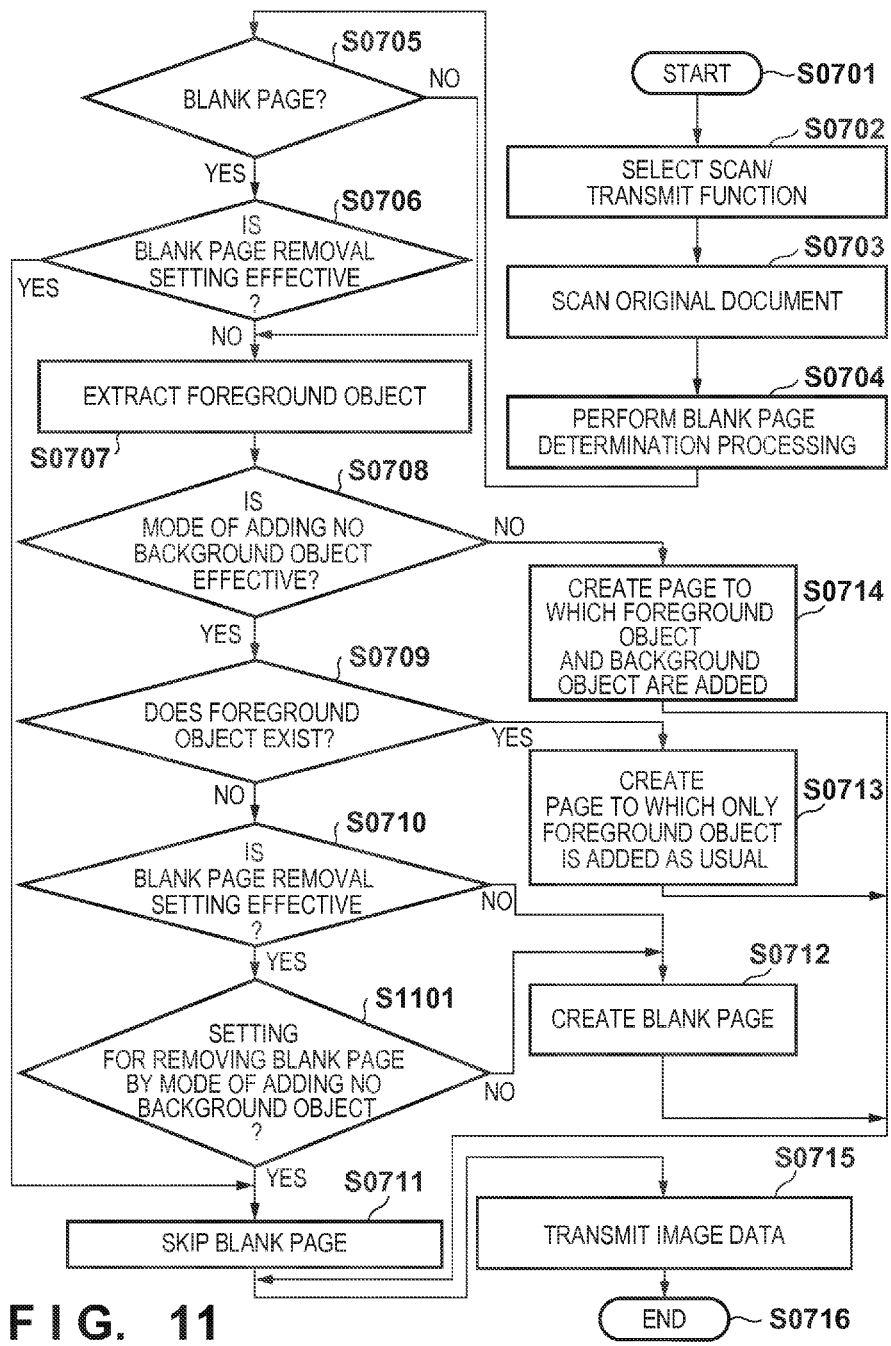
F I G. 11

IMAGE PROCESSING APPARATUS, METHOD, AND MEDIUM DETERMINING WHETHER IMAGE DATA OF A PAGE TO BE PROCESSED IS BLANK AND CONTAINS A FOREGROUND OBJECT AND TRANSMITTING THE FOREGROUND OBJECT OBTAINED BY REMOVING A BACKGROUND OBJECT

BACKGROUND OF THE INVENTION

1. Field of the Invention

The present invention relates to an image processing apparatus and a method of controlling the same, and more particularly, to an image processing apparatus and method for determining whether read image data is blank page image data.

2. Description of the Related Art

In an image reading apparatus such as a digital copying machine, if read image data is blank page data containing no image object, throughput, a paper sheet, power, and the like are wasted for image processing and print processing. For this reason, there are provided various types of methods of deleting image data determined as a blank page and suppressing the consumption of wasteful printing, paper sheets, and toner.

For example, Japanese Patent No. 4251629 has proposed a method of controlling the execution of subsequent print processing in accordance with the determination result obtained by a blank page determination circuit upon inputting the luminance signal obtained at the time of reading an original to the blank page determination circuit.

This method, however, cannot detect the blank page data generated by image processing with respect to read image data.

Recently, for example, when creating a document, the user tends to use sophisticated functions of elaborately decorating fonts, freely creating graphic patterns, and capturing photos and the like, as well as simply typing characters. However, the more sophisticated the contents of a product, the greater the effort required to newly create a document. It is therefore required to reuse part of a document created in the past without any change or a processed/edited document as much as possible.

Under the circumstances, there are conceivable techniques for obtaining the contents of a document printed on a paper sheet or the like as reusable data. For example, Japanese Patent Laid-Open No. 1-129358 discloses a technique of, when making an apparatus electronically read a document on a paper sheet, acquiring a document matching the contents of the read document by searching a database, and allowing the acquired document to be used in place of the data acquired from the read sheet surface. In addition, when no identical document can be specified from the database, a read document image is converted into electronic data (to be referred to as document data) that can be easily edited and reused. In this case as well, the contents of the document can be reused. Japanese Patent Laid-Open No. 1-129358 discloses a technique of identifying areas such as a character area, a line drawing area, a natural image area, and a table area in a document image, and constructing data expressing the relationship between the respective areas in the form of a tree structure. A document image is converted into an electronic document page, which can be edited by an application, by arranging character codes, vector data, image data, and the like in accordance with the above structure. This electronic data has a layout identical to that of the original document, and facilitates changing the positions and sizes of characters and graphic patterns and also performing editing, such as geometrical deformation and coloring, like an electronic document page newly created by a document creation application or the like.

In addition, there is available a technique of recognizing the structure of a table form area in a document image. For example, Japanese Patent Laid-Open No. 1-129385 discloses a technique of acquiring the matrix structure formed by a rectangular frame area in a table. It is possible to convert a table area in a document image into electronic data (document data) having a table structure by combining the row structure of a frame area obtained by this technique with an OCR result obtained from intra-frame characters by the technique.

The above document data can be classified into foreground objects which are areas such as a character area, a line drawing area, a natural image area, and a table area extracted from a document image and background objects as other images. A background object is prepared such that the electronic document obtained by drawing vector data and clipped image data as foreground objects on the background object has an appearance equivalent to that of the original document image. A background object is created by erasing pixel information corresponding to foreground objects from an input document image.

FIG. 6B shows an example of a background object created from an example of an input document image in FIG. 6A. The line drawing portions in FIG. 6A, i.e., line drawing portion pixels such as character pixel clusters 601 to 603, a line drawing pixel cluster 608, and a table frame pixel cluster 604 are painted out in the same pixel colors as those of neighboring pixels. In addition, the entire rectangular range of a natural image area 609 is painted out in the same color as that of neighboring pixels.

Document data created from a document image in this manner generally contains foreground objects and a background object. There is known a function of creating electronic document data without adding any background object to improve reusability with respect to the user. When an original image with this function being effective is converted into document data, only background object is obtained from a page without any foreground object, such as character data. As a result, no document data is created from this page. If a page from which no data is created is not output, the number of original pages differs from the number of pages of output document data. For this reason, it is necessary to perform control so as to add blank pages. As a result, when a page determined not to be a blank page by the above blank page determination method is converted into electronic document data, a blank sheet may be newly created.

SUMMARY OF THE INVENTION

As described above, blank page data may be generated by image processing for read image data. This blank page data cannot be detected by the technique disclosed in Japanese Patent No. 4251629. Even if, therefore, a blank page removal mode of removing blank page data from document data is set, blank page data generated by conversion processing for document data is not removed, and an output product different from the blank page determination result is created.

According to one aspect of the present invention, an image processing apparatus comprises an image processing apparatus comprising: a determination unit which determines whether image data of a page to be processed contains a foreground object; and a transmission control unit which controls transmission of the page to be processed to transmit a foreground object, as document data of the page to be processed, obtained by removing a background object from an image on the page to be processed if the page to be processed is determined as containing a foreground object by the determination unit, and not to transmit the page to be processed if the page to be processed is determined as not containing a foreground object by the determination unit.

According to the present invention, even if no background image is added when a document image is converted into electronic document data, it is possible to detect a blank page generated by the conversion. This makes it possible to handle even a blank page generated by conversion as a blank page and maintain blank page/non-blank page consistency.

Further features of the present invention will become apparent from the following description of exemplary embodiments with reference to the attached drawings.

BRIEF DESCRIPTION OF THE DRAWINGS

FIG. 3 is a block diagram showing an example of the arrangement of a scanner 0212;

FIG. 4 is a block diagram showing an example of the arrangement of a blank page determination processing unit 0304;

FIG. 11 is a flowchart showing data processing in the second embodiment.

DESCRIPTION OF THE EMBODIMENTS

First Embodiment

Figure 1:
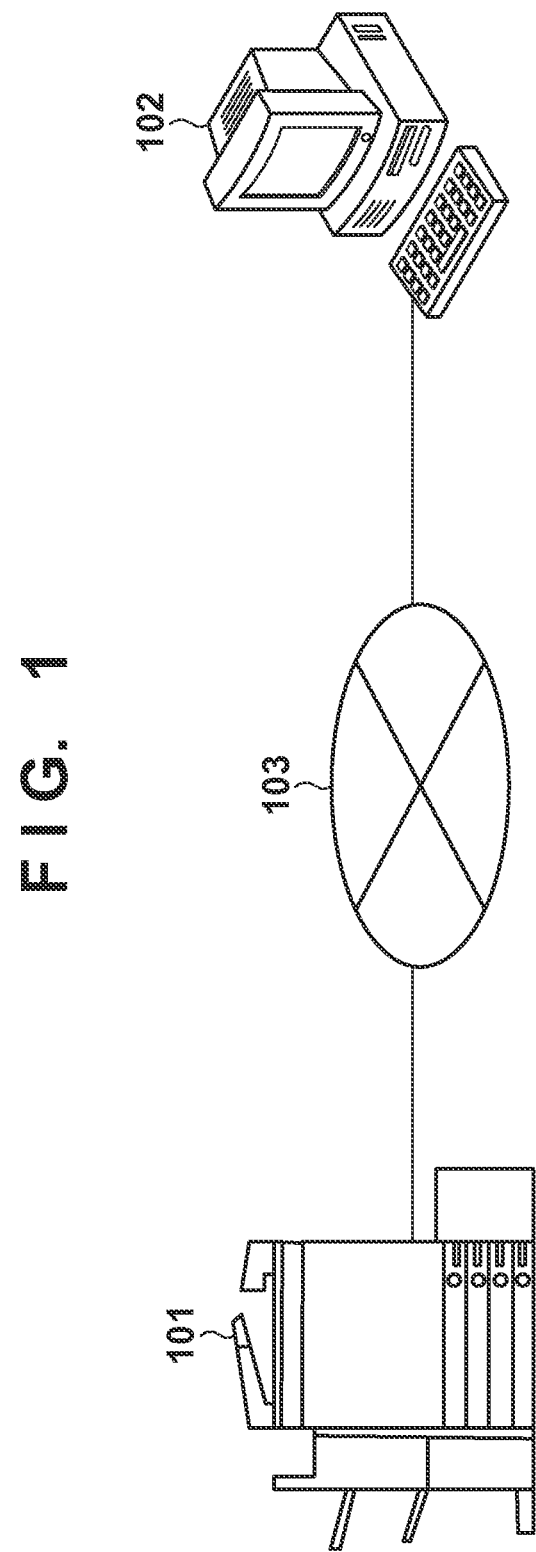
FIG. 1 is a schematic view showing how an image processing apparatus 101 is connected to an external apparatus via a network 103.

The embodiments for carrying out the present invention will be described with reference to the accompanying drawings. FIG. 1 is a view showing an arrangement according to an embodiment of the present invention. An image forming apparatus 101 can scan, as a color image, an image on an original (also referred to as a document or an original document) set on a platen by the user, and output the image obtained by performing image processing on the scanned image. In this embodiment, for the purpose of brief explanation, it is assumed that the original on the platen of the image forming apparatus consists of a sheet of paper. Of course the present invention can be applied to a document containing a plurality of sheets. A PC (Personal Computer) 102 is connected to the image forming apparatus 101 via a network 103. The image forming apparatus 101 can transmit image data to the PC 102 via the network 103.

<Arrangement of Image Forming Apparatus>

Figure 2:
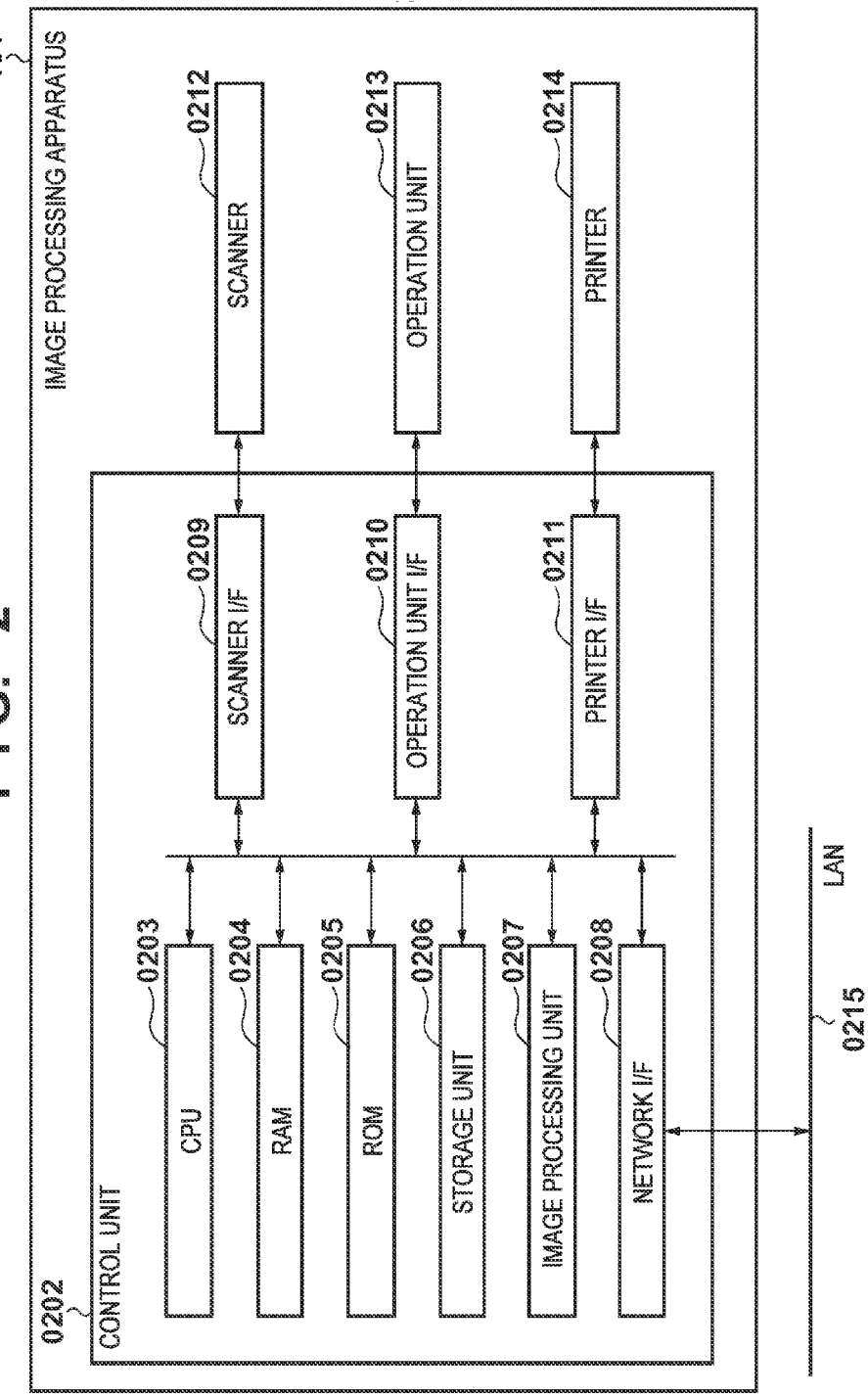
FIG. 2 is a block diagram showing an example of the arrangement of the image processing apparatus 101.

FIG. 2 is a block diagram showing an example of the arrangement of the image forming apparatus 101 according to this embodiment. The image forming apparatus 101 is, for example, a digital copying machine. However, the image forming apparatus 101 is not limited to this as long as it is a device having at least an image scanner. The image forming apparatus according to this embodiment also has image processing functions such as an object extraction function, and hence can also be called an image processing apparatus. Referring to FIG. 2, a control unit 0202 is connected to a scanner 0212 as an image input device and a printer 0214 as an image output device, and controls the input/output of image information. On the other hand, the control unit 0202 is connected to a LAN 0215, and, for example, transmits a transmission job via the LAN. A CPU 0203 controls the operation of the image processing apparatus 101, and operates based on a program stored in a RAM 0204. A ROM 0205 is a boot ROM, in which a boot program for the system is stored. A storage unit 0206 stores system software, image data, programs for controlling the operation of the image processing apparatus 101, and the like. A program stored in the storage unit 0206 is loaded into the RAM 0204. The CPU 0203 controls the operation of the image processing apparatus 101 based on the loaded program. An image processing unit 0207 performs various types of image edit processing for image data input from a scanner I/F 0209. For example, the image processing unit 0207 also performs mask processing described with reference to FIG. 1. A network I/F 0208 is connected to the LAN 0215 and controls the input/output of various types of information via a network. The scanner I/F 0209 connects the scanner 0212 as an image input device to the control unit 0202. An operation unit I/F 0210 is an interface that connects an operation unit 0213 to the control unit 0202. In addition, the operation unit I/F 0210 transfers the information input by the user via the operation unit 0213 to the CPU 0203. A printer I/F 0211 connects the printer 0214 as an image output device to the control unit 0202.

The arrangement of the scanner 0212 will be described next with reference to FIG. 3. FIG. 3 shows the internal arrangement of the scanner 0212. Referring to FIG. 3, image data on an original is read via a reading device 0301. The read analog image data is output to processing units at the subsequent stage. An A/D conversion unit 0302 converts the data read by the reading device 0301 into digital data. A read image processing unit 0303 performs processing such as shading correction to match the level of a highlight portion (white) with that of a dark portion (black) of the read image data, MTF (Modulation Transfer Function) correction, and high frequency suppression processing. A blank page determination processing unit 0304 refers to image data 0305 processed by the read image processing unit 0303 to perform a blank page determination to determine whether the read image data is a blank page. The scanner 0212 outputs the image data 0305 obtained by processing the read original image data using the read image processing unit 0303 and a blank page determination result 0306 obtained by the blank page determination processing unit 0304. The output data and the blank page determination result obtained by the scanner 0212 are transferred to the storage unit 0206 under the control of the control unit 0202. The storage unit 0206 temporarily stores the transferred image data and the blank page determination result.

Figures 5A, 5B:
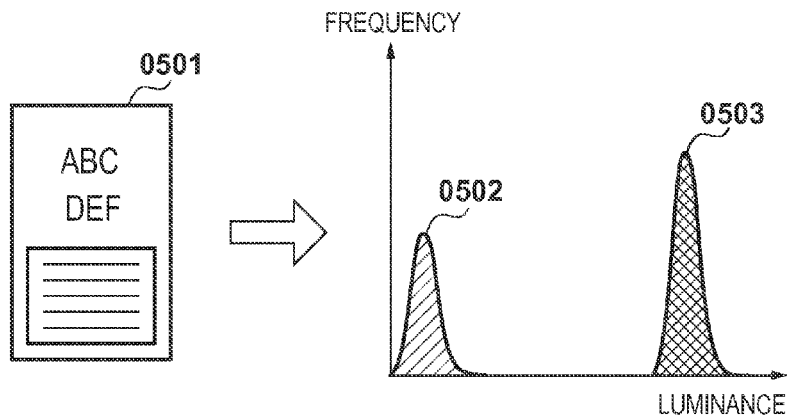
FIGS. 5A, 5B, 5C, and 5D are views showing examples of histograms concerning a non-blank original page and a blank original page.
Figures 5C, 5D:
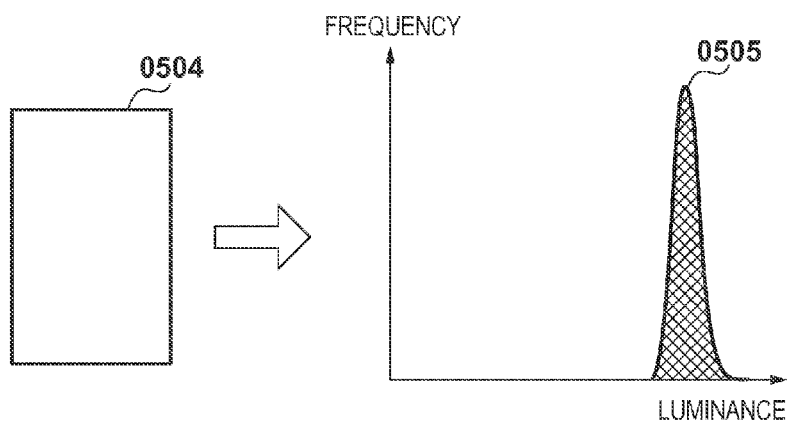

FIG. 4 shows the internal arrangement of the blank page determination processing unit 0304 according to this embodiment. Assume that the blank page determination processing unit 0304 is connected to a register (not shown) and holds control parameters and processing results. The CPU 0203 and the blank page determination processing unit 0304 write in the register. The blank page determination processing unit 0304 reads out control parameters set in the register and operates. The image data 0305 is digital image data output from the read image processing unit 0303. The blank page determination result 0306 is an output result from the blank page determination processing unit 0304, and is a signal representing whether digital image data is a blank page. A histogram creation unit 0401 creates a histogram representing the frequency of pixels for each luminance in the image data from, for example, the image data 0305 of one page. A histogram analysis unit 0402 analyzes the features of the histogram created by the histogram creation unit 0401, and determines whether the original image is a blank page. An example of the operation of the histogram analysis unit 0402 will be described with reference to FIGS. 5A to 5D. For example, FIGS. 5B and 5D respectively show the histograms created by the histogram creation unit 0401 with respect to an original page 0501 that is not a blank page, as shown in FIG. 5A, and a blank original page 0504 like that shown in FIG. 5C. In the histogram in FIG. 5B corresponding to the original page 0501 that is not a blank, a peak 0502 corresponding to a character portion or the like of the original page and a peak 0503 corresponding to a background portion appear. For example, it can be determined that the highest peak corresponds to a background portion. On the other hand, in the histogram in FIG. 5D corresponding to the blank original page 0504, only a peak 0505 corresponding to a background portion (ground color when it is a blank page) appears. Analyzing the features of such histograms will determine whether the digital image data is a blank page containing no image object. The processing characteristic to this embodiment will be described next with reference to the accompanying drawings.

Figure 7:
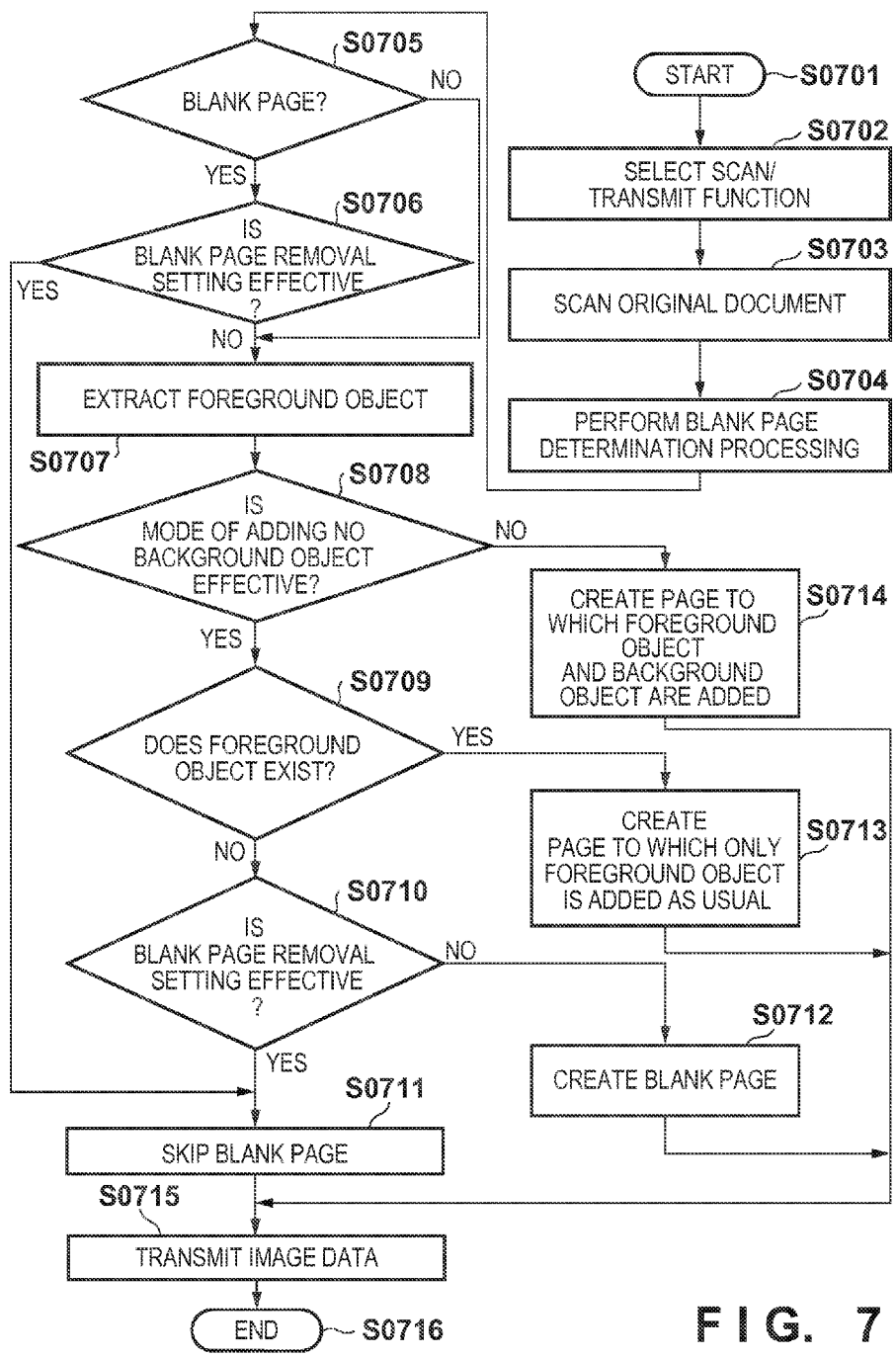
FIG. 7 is a flowchart showing data processing in the first embodiment.

The operation of converting a scanned image into electronic data, which can be edited and which facilitates reuse and outputting (transmitting in this case) the data when performing blank page removal in this embodiment, will be described next with reference to FIGS. 7 and 8. In the following description, a blank page indicates image data containing no image object, that is, a page having no print information at the time of printing. A page having no print information, even if it is a color sheet having a background portion that is uniformly colored, is regarded as a blank page. In addition, the use of the term "removal" indicates that image data stored in the storage unit 0206 is not handled as an output target. This processing is implemented by causing the CPU 0203 to execute a program stored in the storage unit 0206 upon loading the program in the RAM 0204 in the control unit 0202. In addition, the user can input settings about whether to execute blank page removal processing via, for example, a user interface (not shown) provided by the image forming apparatus 101. The settings are stored in, for example, the storage unit 0206 and referred to in step S0706 or the like. Note that referring to FIG. 7, steps S0704 to S0714 are executed for each read page as a processing target page.

Figure 8:
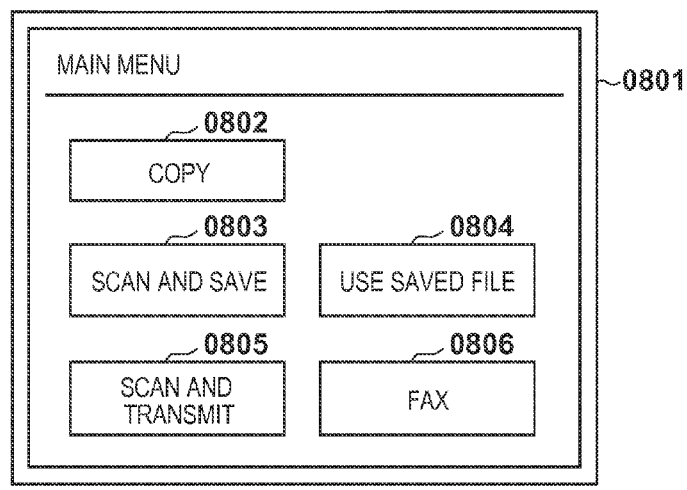
FIG. 8 is a view showing an example of a screen for accepting function selection.

First of all, in step S0702, the control unit 0202 displays, on the operation unit 0213, a main menu 0801 that accepts the selection of a function shown in FIG. 8. A button 0802 is a button for selecting a copy function. A button 0803 is a button for selecting a box scan function of temporarily storing the image data read by the scanner 0212 in the storage unit 0206. A button 0804 is a button for selecting image data stored by the above box scan function when printing the data by using the printer 0214 or transmitting the data to an external apparatus such as the PC 102. A button 0805 is a button for selecting the image data read by the scanner 0212 when transmitting the data to an external apparatus such as the PC 102. A button 0806 is a button for selecting the image data read by the scanner 0212 when faxing the data to an external apparatus (not shown).

Upon detecting that the scan/transmit function selection button 0805 is pressed, the control unit 0202 displays a "scan and transmit" function screen on the operation unit 0213 (step S0702). When another button is pressed, processing corresponding to the pressed button is executed. However, a description of this operation will be omitted. When the control unit detects the pressing of the start key button (not shown) on the scan/transmit function screen (not shown) on the operation unit 0213, the process advances to step S0703 to scan an original page on a page basis by using the scanner 0212. In step S0704, the control unit 0202 then causes the blank page determination processing unit 0304 to execute the first blank page determination processing for the image data 0305 obtained by scanning on a page basis. Subsequently, the image data 0305 and the blank page determination result 0306 are stored in the storage unit 0206. In step S0705, the following processing operations are switched depending on the blank page determination result 0306 obtained by the blank page determination processing unit 0304 described above. If a blank page is determined, the control unit 0202 determines whether the blank page removal setting has been made (step S0706). The user sets in advance, on the blank page removal setting screen (not shown) on the operation unit 0213, whether to perform blank page removal or output a blank page without any change. If the blank page removal setting is effective, the processing of the corresponding page is stopped (step S0711), and image data that skips a blank page (that is, excludes a blank page) is transmitted to an external apparatus such as the PC 102 via the network 103 (step S0715). That is, a page formed from only a background object is handled as a blank page, and hence is not output. Upon determining in step S0705 that the target page is not a blank page or determining in step S0706 that the blank page removal setting is not effective, the process advances to step S0707.

Figure 6A:
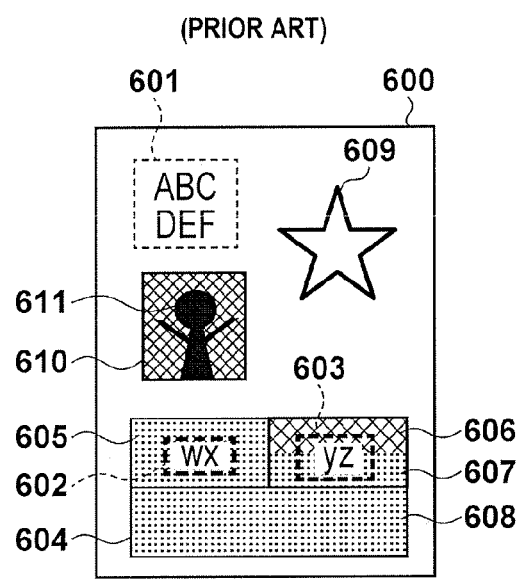
FIGS. 6A and 6B are schematic views showing foreground and background objects in a general original page.
Figure 6B:
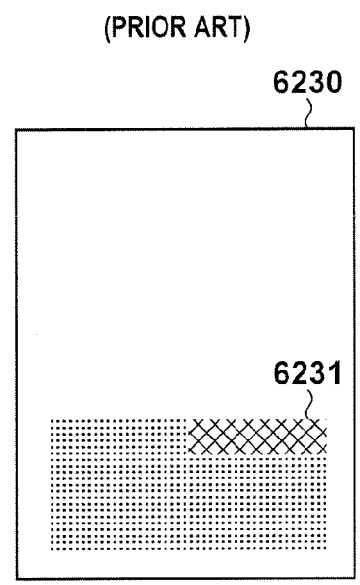

In step S0707, the image processing unit 0207 performs image processing necessary for the transmission of an image with respect to the image data 0306 of the page as a processing target, and holds the resultant data in the RAM 0204. The CPU 0203 then performs foreground object extraction processing with respect to the image having undergone the image processing. In this case, the CPU 0203 obtains the various types of foreground objects shown in FIG. 6A and the background object shown in FIG. 6B. It is preferable to obtain the types of obtained foreground objects as the attributes of the foreground objects and to store the numbers of obtained foreground objects for the respective types and the total number of foreground objects. In step S0708, the control unit 0202 determines whether the mode of adding no background object is effective. If the mode of adding no background object is effective, the control unit 0202 sets only the foreground objects extracted in step S0707 as output targets. Note that the user makes the setting for object extraction in advance. More specifically, the user sets in advance the mode of adding no background object on an "add no background object" mode setting screen (not shown) on the operation unit 0213. If the mode of adding no background object is ineffective, a page is created by adding both foreground objects and a background object(step S7014).

If the mode of adding no background object, that is, the option of outputting no background object, is effective, the control unit 0202 determines whether any foreground object exists (step S0709). If it is determined by this foreground determination that foreground objects exist, a page having only the foreground objects is created (step S0713). If no foreground object exists, the control unit 0202 determines, as in step S0706, whether the blank page removal setting has been made (step S0710). If the blank page removal setting is ineffective, the control unit 0202 creates a blank page to replace a page having no foreground object with the blank page (step S0712). If the blank page removal setting is effective, the control unit 0202 stops the processing for the corresponding page and skips the processing target page (current page) to be output as a blank page, in order to secure consistency between the setting and the output product (step S0711).

With the above arrangement and procedure, even if a scanned document image is not determined as a blank page and a blank page is generated by conversion processing to document data in accordance with object extraction settings, removal or insertion of the blank page is controlled in accordance with the blank page removal setting.

This embodiment can secure consistency between the mode of adding no background object and the blank page removal setting. Although the embodiment has exemplified the function of transmitting image data, similar processing can be applied to other functions such as the copy function.

Second Embodiment

According to the first embodiment, in order to secure consistency between the mode of adding no background object and the blank page removal setting, even a page on which images exist is removed if it is determined that all the images are background objects. Although this processing is required to secure consistency between the blank page removal setting and an output product, some user may want to discriminate between a case in which an original page is a blank page (step S0705) and a case in which an original page is not a blank page but has no foreground object, and hence is handled as a blank page output (step S0709). This embodiment will exemplify three means or methods of discriminating the above two cases by using FIGS. 7 and 9 to 11.

The first method will be described with reference to the flowchart of FIG. 11. This processing is executed by causing a CPU 0203 to execute a program which is stored in a storage unit 0206 and loaded in a RAM 0204 in a control unit 0202.

The user sets in advance the option of "executing/not-executing blank page removal by mode of adding no background object" (not shown) on an operation unit 0213 to "execute". The option of "executing/not-executing blank page removal by mode of adding no background object" is an option for setting whether to regard a page from which no foreground object can be extracted as a blank page and remove it, when the option of "adding no background object" is selected. The processing up to step S0710 is the same as that in FIG. 7. If the blank page removal setting is effective in step S0710, the control unit 0202 determines whether to set "blank page removal by mode of adding no background object". When executing "blank page removal by mode of adding no background object", the control unit 0202 stops the processing for the corresponding page and skips the blank page as in FIG. 7 (step S0711). When not executing "blank page removal by mode of adding no background object", the control unit 0202 creates a blank page (step S0712). This makes it possible to set whether to perform blank page removal while discriminating a page corresponding to a blank original page or a page which is a blank page output because the corresponding original page does not have any foreground object even though the original page is not a blank page.

Third Embodiment

Figure 9:
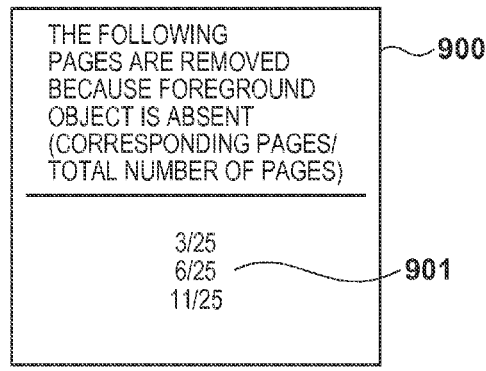
FIG. 9 is a view showing a page describing pages removed as blank pages.

The second and third methods of discriminating between the case in which an original is a blank page and the case in which an original is not a blank page but has no foreground object, and hence is handled as a blank page output will be described as the third embodiment. In the second method, a page 900 indicating the pages to be removed as blank pages, as shown in FIG. 9, is added to the last page. The total number of pages and the page numbers of pages removed as blank pages are written on a page display portion 901. In the case shown in FIG. 9, the total number of pages is written as "25" on the right side, and the page numbers of pages removed as blank pages are written as "3", "6", and "11" on the left side. In order to improve convenience, an image processing unit 0207 may create thumbnails of scanned document images of pages removed as blank pages and write them on the page 900. Seeing the page 900 will allow the user to check a page that is removed as a blank page because the original has no foreground object even though the original is not a blank page.

Figure 10:
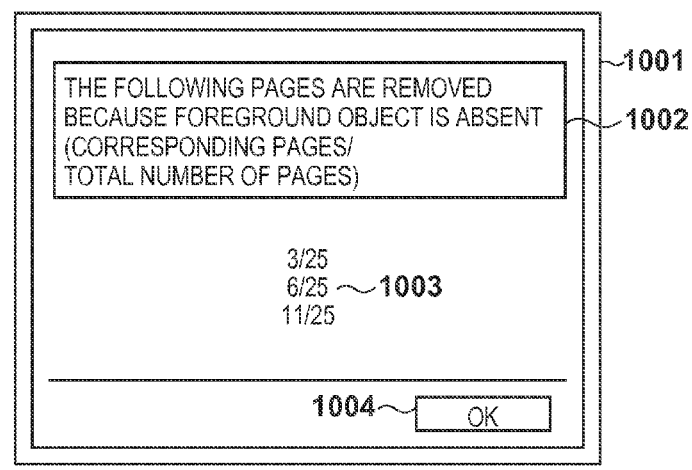
FIG. 10 is a view showing a UI screen displaying pages removed as blank pages.

According to the third method, when an image is transmitted in step S0715, a UI screen like that shown in FIG. 10 may be displayed on an operation unit 0213. The total number of pages and pages removed as blank pages are displayed on a page display portion 1003 of the user interface, like the page display portion 901 on the printed sheet. In addition, a message portion 1002 is also displayed like a printed product. By seeing a UI screen 1001 when transmitting an image, the user can check a page that is removed as a blank page because the original has no foreground object even though the original is not a blank page.

With the three means described above in the second and third embodiments, it is possible to discriminate between the case (step S0705) in which an original itself is a blank page and hence is handled as a blank page output and the case (step S0709) in which an original is not a blank page but has no foreground object, and hence is handled as a blank page output and removed. Note that the third embodiment can be executed simultaneously with not only the first embodiment, but also the second embodiment. For this purpose, the page number of any page removed because of the absence of a foreground object extracted by conversion processing for document data is stored between step S0701 and step S0711 in the first embodiment or stored between step S1101 and step S0711 in the second embodiment. Note that the total number of pages is the number of pages excluding a page of scanned document images that is determined as a blank page in step S0705. The page number to be stored is the ordinal position in the number of pages. A page on which the stored page number is recorded is added to, for example, the end of document data or displayed on a user interface screen.

Fourth Embodiment

The second and third embodiments have exemplified the means for discriminating between the case in which an original is a blank page and the case in which an original is not a blank page but has no foreground object, and hence is handled as a blank page output. However, the second embodiment cannot discriminate pages determined as blank pages between a case in which an image area on an original is very small and similar to a blank page and a case in which an image area is large. Some user may want to know only the case (step S0709) in which an original is handled as a blank page output because of the absence of a foreground object even though an image area on the original is large. This embodiment will exemplify a means for switching the processing in the second embodiment depending on an image area on an original.

The first and second embodiments have handled the blank page determination result 0306 obtained by the blank page determination processing unit 0304 as information representing a blank page/non-blank page. However, it is possible to classify non-blank pages for each printed area according to levels by calculating the areas of originals on which print information is written. For example, it is possible to calculate levels based on the value of the peak 0502 corresponding to a portion other than the background in FIG. 5B and the number of peaks. Consider, for example, a case in which the maximum value is 5, with a complete blank page corresponding to level 0, and image areas increasing with an increase in level value. In this case, the user selects in advance thresholds (to be referred to as option thresholds) for the execution of processing in the second or third embodiment.

That is, for example, the blank page determination processing unit 0304 outputs the determination results obtained by using preset thresholds of the respective levels. If, for example, thresholds of six levels from 0 to 5 are set as described above, a blank page determination with six levels with reference to the respective thresholds is performed, and blank page determination results based on the respective levels are output. Note that the determination results are temporarily stored. Subsequently, for example, in step S0705 in FIGS. 7 and 11, it is determined whether an output signal at a level set by the user represents a blank page. If, for example, the user has set 3 as a blank page determination level, the determination result based on level 3 is referred to and set as a reference for blank page determination. If it is determined that the output signal does not represent a blank page, the process advances to step S0707.

If NO is determined in step S1101 in FIG. 11 in the second embodiment, the temporarily stored blank page determination result is compared with the above option threshold. If the level of the blank page determination result (the lowest level at which the corresponding page is determined not as a blank page) is higher than the option threshold, the process advances to step S0712 to make blank page removal ineffective. If the level of the blank page determination result is equal to or less than the option threshold, the process advances to step S0711 to perform blank page removal.

When the third embodiment is applied to the second embodiment, if YES is determined in step S1101 in FIG. 11, the temporarily stored blank page determination result is compared with the option threshold described above. If the level of the blank page determination result (the lowest level at which the corresponding page is determined not as a blank page) is higher than the option threshold, the corresponding page number is stored. If the condition is not satisfied, the page number is not stored. In any case, the processing in step S0711 is performed. This blank page processing is performed for each page. The page shown in FIG. 9 is added, based on the stored page number, to the end of document data to be transmitted or displayed on the user interface shown in FIG. 10 after the document data to be transmitted is confirmed.

When, for example, the user selects level 4 as an option threshold in this manner, the processing described in the second or third embodiment is executed with respect to only pages whose blank page determination results 0306 indicate level 4 and level 5. This makes it possible to perform, with respect to only a page having an image whose area is equal to or greater than an area which the user wants to check, the processing (second embodiment) of inserting even a blank page generated by conversion processing to document data as a blank page, regardless of the blank page removal setting or performing display indicating the blank page or handling the page as an added page (third embodiment).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-251416, filed Dec. 4, 2013, which is hereby incorporated by reference herein in its entirety.

What is claimed is:

1. An image processing apparatus comprising:
a reading unit which reads an image to acquire image data corresponding to the image;
a transmission unit which transmits image data; and
a control unit;
wherein the control unit comprises:
   a blank page determination unit which determines whether or not image data of a page to be processed acquired by the reading unit is blank;
   a determination unit which determines whether the image data of the page to be processed contains a foreground object; and
   a transmission control unit which
      controls the transmission unit not to transmit the image data of the page to be processed if it is determined by the blank page determination unit that the image data is blank,
      controls the transmission unit to transmit a foreground object obtained by removing a background object from the image data of the page to be processed if it is determined by the blank page determination unit that the image data is not blank and it is determined by the determination unit that the image data does include the foreground object, and controls the transmission unit not to transmit the image data of the page to be processed if it is determined by the blank page determination unit that the image data is not blank and it is determined by the determination unit that the image data does not include the foreground object.

2. The apparatus according to claim 1, wherein the determination unit determines that the foreground object is contained in the image data of the page to be processed, when a transmission setting is made that causes the transmission unit not to transmit a background object contained in the image data of the page to be processed, and the transmission control unit controls the transmission unit to transmit the foreground object as document data of the page when the transmission setting is made.

3. The apparatus according to claim 2, wherein the transmission control unit controls the transmission unit to transmit the foreground object and background object as document data of the page, when the transmission setting is not made that causes the transmission unit not to transmit the background object.

4. The apparatus according to claim 1, further comprising a unit which determines whether a blank page removal setting for removing a page determined as a blank page is effective, wherein the transmission control unit controls the transmission unit not to transmit image data of a page determined as not containing the foreground object, when the blank page removal setting is effective, and controls the transmission unit to transmit, as a blank page, image data of a page determined as not containing the foreground object, when the blank page removal setting is not effective.

5. The apparatus according to claim 4, wherein the transmission control unit controls the transmission unit not to transmit image data of a page determined as not containing the foreground object, when the transmission setting has been made that causes the transmission unit not to transmit the background object, the blank page removal setting is effective, and a setting has been made that causes the transmission unit not to transmit image data of a page which does not contain the foreground object.

6. The apparatus according to claim 1, wherein the transmission control unit controls the transmission unit to transmit image data of a page recording thereon a page number of a page whose image data has not been transmitted in addition to the transmitted image data because the determination unit has determined that the image data of the page does not contain the foreground object.

7. The apparatus according to claim 1, further comprising a unit which displays a page number of a page whose image data has not been transmitted by the transmission unit because the determination unit has determined that the image data of the page does not contain the foreground object.

8. The apparatus according to claim 2, further comprising a user interface unit which allows a user to input the transmission setting that causes the transmission unit not to transmit the background object contained in image data of the page to be processed.

9. The apparatus according to claim 4, further comprising a user interface unit, which allows a user to input the blank page removal setting.

10. The apparatus according to claim 5, further comprising a user interface unit, which allows a user to input the setting that causes the transmission unit not to transmit image data of a page which does not contain the foreground object.

11. An image processing method performed by an image processing apparatus having a reading unit which reads an image to acquire image data corresponding to the image and a transmission unit which transmits image data, the method comprising:
reading with the reading unit an image to acquire image data corresponding to the image;
determining in a first determining step whether or not image data of a page to be processed, acquired by the reading unit in the reading step, is blank;
determining in a second determining step whether the image data of the page to be processed contains a foreground object;
controlling the transmission unit not to transmit the image data of the page to be processed if it is determined in the first determining step that the image data is blank;
controlling the transmission unit to transmit a foreground object obtained by removing a background object from the image data of the page to be processed if it is determined in the first determining step that the image data is not blank and it is determined in the second determining step that the image data does include the foreground object;
controlling the transmission unit not to transmit the image data of the page to be processed if it is determined in the first determining step that the image data is not blank and it is determined in the second determining step that the image data does not include the foreground object; and
transmitting with the transmission unit the image data under the conditions specified in the controlling steps and refraining from transmitting with the transmission unit the image data under the conditions specified in the controlling steps.

12. A non-transitory computer-readable medium recording a program therein for causing a computer of an image processing apparatus to execute an image processing method, the image processing apparatus having a reading unit which reads an image to acquire image data corresponding to the image and a transmission unit which transmits image data, the image processing method comprising:
reading with the reading unit an image to acquire image data corresponding to the image;
determining in a first determining step whether or not image data of a page to be processed, acquired by the reading unit in the reading step, is blank;
determining in a second determining step whether image data of a page to be processed contains a foreground object;
controlling the transmission unit not to transmit the image data of the page to be processed if it is determined in the first determining step that the image data is blank;
controlling the transmission unit to transmit a foreground object obtained by removing a background object from the image data of the page to be processed if it is determined in the first determining step that the image data is not blank and it is determined in the second determining step that the image data does include the foreground object;
controlling the transmission unit not to transmit the image data of the page to be processed if it is determined in the first determining step that the image data is not blank and it is determined in the second determining step that the image data does not include the foreground object; and
transmitting with the transmission unit the image data under the conditions specified in the controlling steps and refraining from transmitting with the transmission unit the image data under the conditions specified in the controlling steps.

* * * * *